United States Patent
Baudouin

(10) Patent No.: US 6,437,827 B1
(45) Date of Patent: Aug. 20, 2002

(54) FILTERING VIDEO SIGNALS CONTAINING CHROMINANCE INFORMATION

(75) Inventor: Charles Baudouin, Eastleigh (GB)

(73) Assignee: Tandberg Television ASA, N-Lysaker (NO)

( * ) Notice: Subject to any disclaimer, the term of this patent is extended or adjusted under 35 U.S.C. 154(b) by 0 days.

(21) Appl. No.: 09/280,770

(22) Filed: Mar. 29, 1999

(30) Foreign Application Priority Data

Apr. 3, 1998 (GB) ............................................. 9807201

(51) Int. Cl.[7] ........................... H04N 11/20; H04N 5/21
(52) U.S. Cl. ....................................... 348/453; 348/624
(58) Field of Search ................................. 348/453, 444, 348/582, 610, 624, 609; 382/261, 262, 263, 266; 708/301, 304, 306, 309, 311, 322

(56) References Cited

U.S. PATENT DOCUMENTS

| 5,253,043 A | | 10/1993 | Gibson | |
|---|---|---|---|---|
| 5,448,309 A | * | 9/1995 | Won | 348/607 |
| 5,559,563 A | * | 9/1996 | Takahashi et al. | 348/625 |
| 5,606,375 A | * | 2/1997 | Lee | 348/606 |
| 5,635,990 A | * | 6/1997 | Yi | 348/606 |
| 5,650,824 A | * | 7/1997 | Huang | 348/453 |
| 5,959,693 A | * | 9/1999 | Wu et al. | 348/624 |

* cited by examiner

Primary Examiner—John W. Miller
Assistant Examiner—Annan Q Shang
(74) Attorney, Agent, or Firm—Douglas S. Rupert; Wildman, Harrold, Allen & Dixon

(57) ABSTRACT

The present invention relates to filtering an interlaced input digital signal containing fields of chrominance information preparatory to converting the format of the signal by means of a downsampling conversion from a 4:2:2 format to a 4:2:0 format.

Figure 1:
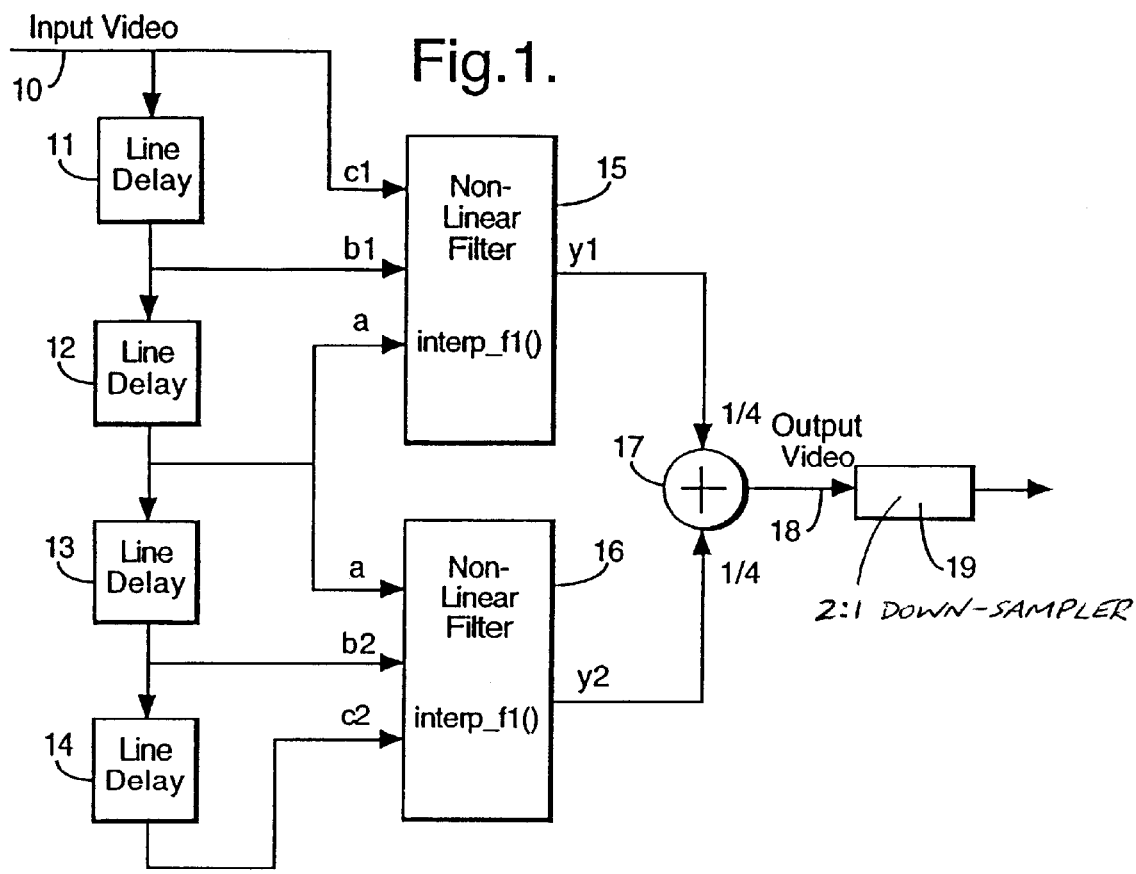

In the invention, the input signal is applied to a delay circuit to derive samples of the input signal representing spatially separated elements from each chrominance field where the spatial separation is of one line. The magnitudes of the samples are compared relative to one another to identify frequencies which fall within different high and low frequency ranges. An adaptive filter has a plurality of frequency responses corresponding to the frequency ranges and a frequency response is selected in accordance with the identified frequency range of the input signal samples.

16 Claims, 2 Drawing Sheets

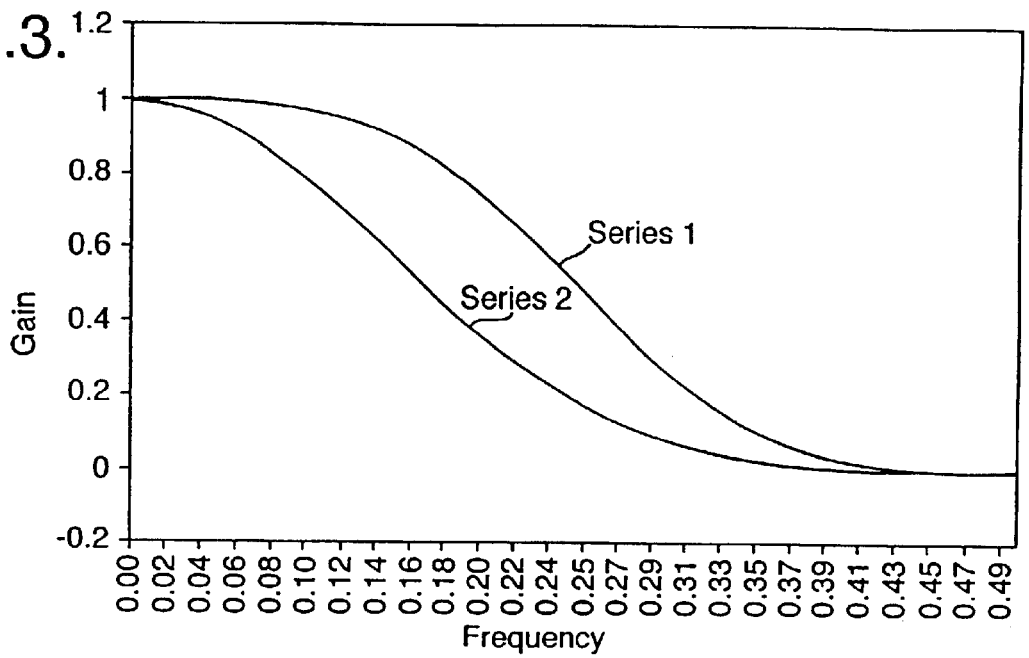

Fig.3.

Fig.4.

```
/* Function to provide nonlinear downsampling filter for field 1 */
int interp_f1 (int a, int b, int c)
{
    int y ;

if ( (b > a && b > c) || (b <= a && b <= c) ) y = a + b;
    else if ( (b > a && 2 * b <= (a + c) ) || (b <= a && 2 * b > (a + c) ) ) y = 2 * a;
    else y = a - c + 2 * b;

return (y) ;
}
```

Fig.5.

```
/* Function to provide nonlinear downsampling filter for field 2 */
int interp_f2 (int a, int b, int c)
{
    int y , v1 , v2;

v1 = 3*a+c;
    v2 = 3*c+a;

if ( (b > a && b > c) || (b <= a && b <=c) ) y = 0;
    else if ( (b <= a && 4*b > v1) || (b > a && 4*b <= v1) ) y = -2*b + 2*a;
    else if ( (b > c && 4*b <= v2) || (b <= c && 4*b > v2) ) y = -2*b + 2*c;
    else y = 2*b - a - c;

return (y) ;
}
```

FILTERING VIDEO SIGNALS CONTAINING CHROMINANCE INFORMATION

The present invention relates to a method and apparatus for filtering an interlaced input digital video signal containing chrominance information.

Digital television signals include both a luminance signal usually referred to as a signal Y and Chrominance information in the form of two colour difference signals usually referred to as signals $C_B$ and $C_R$. Such a television signal may be encoded in what is referred to as the 4:2:2 format so as to reduce the chrominance information to one half of that used for the luminance information in the horizontal direction. A signal in the 4:2:2 format may be converted to another format known as the 4:2:0 format in which the vertical chrominance information is further reduced by a factor of 2. The encoding of digital television signal parameters is effected at sampling frequencies determined by the format of the signal. A conversion from a 4:2:2 format to a 4:2:0 format is known as down-sampling and a conversion from a 4:2:0 format to a 4:2:2 format is known as up-sampling. When a down-sampling or an up-sampling conversion is performed, degradation of the chrominance information and hence in the picture quality may occur. Multiple conversions between the 4:2:2 format and the 4:2:0 format can result in successive degradation of the chrominance information.

A conventional filter used in a down-sampling conversion consists of several delay circuits, each introducing a delay of one line, coupled to a finite impulse response (FIR) filter. To avoid temporal blurring of the colour, the filter operates on each field of the picture independently but this reduces the bandwidth available for the chrominance information to at best one quarter of the original. In order to preserve bandwidth, the down conversion filter tends to be quite long (of the order of 6 or 7 taps) and as a result colour transitions can become visible, especially as such a filter may have large negative coefficients to achieve a satisfactory frequency response.

The present invention aims to provide for improved filtering of a digital video signal for a down-sampling conversion.

According to the present invention there is provided a method of filtering an interlaced digital video signal containing fields of chrominance information, the method comprising: applying the input video signal to a delay circuit to derive samples of the input signal representing spatially separated elements from each chrominance field of the signal; comparing the magnitudes of the samples relative to one another to identify frequencies which fall within a plurality of predetermined ranges; applying the input signal to an adaptive filter having a plurality of frequency response functions corresponding respectively to the predetermined frequency ranges; and, selecting a frequency response function in dependence upon the frequency range identified from the input signal samples.

Further according to the present invention there is provided filter apparatus for filtering an input interlaced digital video signal containing fields of chrominance information, the apparatus comprising: a delay circuit to receive the input video signal and to derive samples representing spatially separated elements from each chrominance field of the input signal; a comparator to compare the magnitudes of the samples relative to one another to identify frequencies within a plurality of predetermined frequency ranges; an adaptive filter having a plurality of frequency response functions corresponding respectively to the predetermined frequency ranges; and, a selector to select a frequency response function in dependence upon the frequency range identified by the comparator.

The invention has the advantage that the frequency response of the filter can be selected to present a flat response to low frequencies and a low-pass response to high frequencies so as to allow alias components to be removed from the signal. Furthermore the response functions can be made to contain no discontinuities between the response functions so that the filter does not introduce significant distortion of its own.

Figure 2:
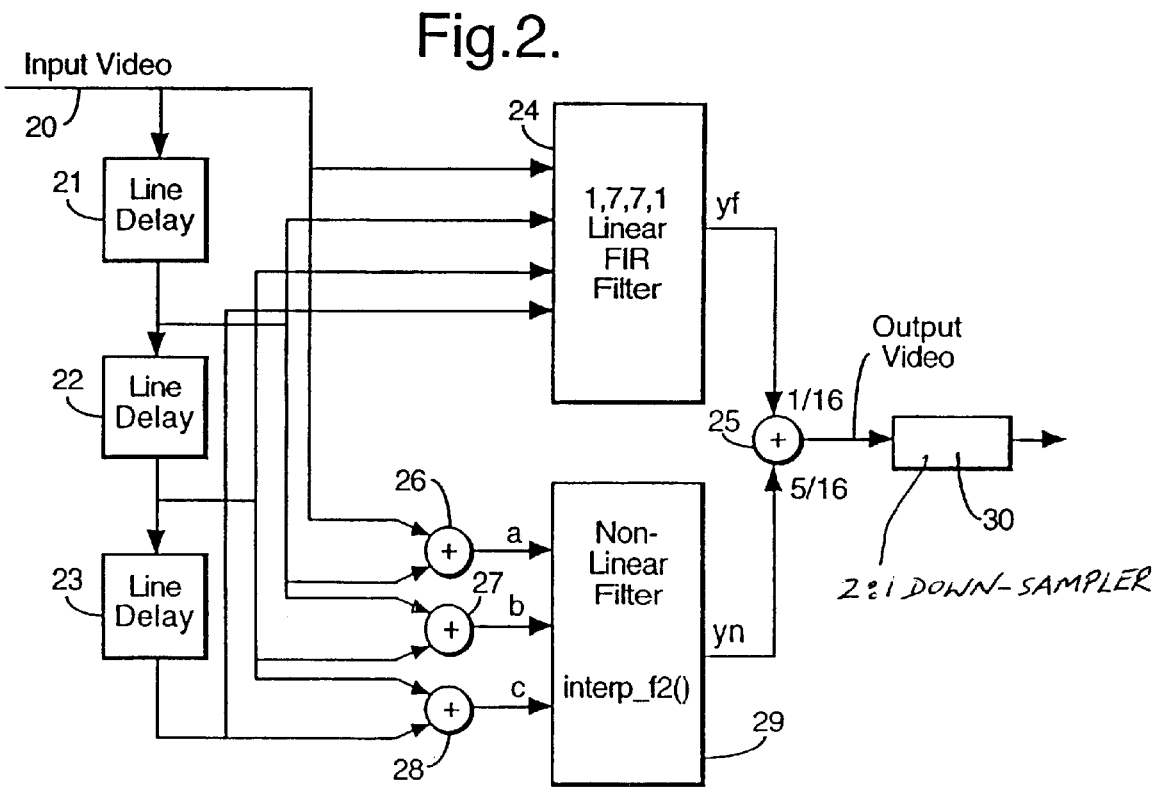

The invention will now be described, by way of example, with reference to the accompanying drawings in which:

FIG. 1 shows a down-sampling filter apparatus according to the present invention for filtering a first field of an input video signal, FIG. 2 shows a down-sampling filter apparatus according to the present invention for filtering a second field of an input video signal, FIG. 3 shows the frequency response curve of the apparatus of FIG. 2, FIG. 4 is a diagram showing a functional representation of two of the filters in FIG. 1; and FIG. 5 is a diagram showing a functional representation of one of the filters in FIG. 2.

In FIG. 1, the first field of an interlaced digital video signal is applied to an input terminal 10. The input terminal 10 is connected to a delay circuit including a string of delay elements 11, 12, 13 and 14. Each delay element imposes a delay equal to one line of the first field of the video signal. The video signal is applied directly to a non linear adaptive filter 15 as an input labelled c1. The output from the first delay element 11, labelled b1, is applied as a second input to the filter 15. The output from the second delay element 12, labelled a, is applied as a third input to the filter 15.

The output from the second delay element 12, labelled a, is also applied as a first input to a second filter 16. The output from the third delay element 13, labelled b2, is applied as a second input to the filter 16. The output from the fourth delay element 14, labelled c2, is applied as a third input to the filter 16. The outputs from the first and second filters 15 and 16, labelled y1 and y2 respectively, are applied to a summing element 17 from which an output video signal is supplied at the output terminal 18. The inputs y1 and y2 applied to the summing element 17 are each divided by 4 within the summing In operation, the delay circuits 11 and 12 provide samples b1 and a of the video signal which are spatially separated from each other and from the first input c1. The spatial separation imposed by each delay element is a vertical separation of one line. The delay elements 13 and 14 also provide samples b2 and c2 of the video signal which are spatially separated from each other and from the input a. The spatial separation imposed by each of the delay elements 13 and 14 is also a vertical separation of one line.

The two filters 15 and 16 have identical frequency responses. Each of the filters 15 and 16 have a comparator function to compare the relative magnitudes of the three inputs to the filter and adapts its frequency response to the comparison. In operation, when the input b1 to the filter 15 has a magnitude outside the range spanned by a and c1, this is indicative of high frequency information in the input video signal. The filter 15 adapts to provide a frequency response function in which it returns an output y1 which is equal to the sum of a and b1. Similarly, when the input b2 to the filter 16 has a magnitude outside the range spanned by the inputs a and c2, the filter adapts to provide a frequency response function in which the output y2 is equal to the sum of a and b2. Each filter 15 and 16 produces a filter response of (1,1) which, when combined in the summing element 17 produces a combined low pass filter response of (1,2,1). The low-pass filter response attenuates the high frequencies and alias components. The inputs y1 and y2 are divided by four to restore to unity the overall gain of the filter circuit in FIG. 1.

When the input b1 to the filter 15 is within a range between the input a and a magnitude of (a+c1)/2, this is indicative of low frequency information. The filter 15 adapts to provide a frequency response function in which it returns an output y1 of a value equal to 2*a. Similarly when the input b2 to the filter 16 is within a range between the input a and a magnitude of (a+c2)/2, this is indicative of low frequency information and the filter 16 adapts to provide a frequency response function in which it returns an output y2 of a value equal to 2*a. The filters 15 and 16 produce a combined response y1 and y2 which is an all flat response.

When the input b1 to the filter 15 is within the range of the input c1 and the magnitude of (a+c1)/2, this is indicative of intermediate frequency information. The filter 15 adapts to provide a frequency response function in which it returns an output y1 which is equal to (a−c1+2*b1). Similarly when the input b2 to the filter 16 is within the range of the input c2 and the magnitude of (a+c2)/2, this is indicative of intermediate frequency information. The filter 16 adapts to provide a frequency response function in which it returns an output y2 which is equal to (a−c2+2*b2).

The two non-linear adaptive filters 15 and 16 may each be implemented as a programmed device, the functions of which can be represented by programming in 'C' as shown in FIG. 4.

It will be noted that the frequency response functions of the filters 15 and 16 have no discontinuities between them and therefore the filters do not introduce significant distortion of their own. The filtered output video signal at the terminal 18 is subjected to a down-sampling conversion in a converter 19 to take odd lines of the field.

In FIG. 2, the second field of the interlaced digital video signal is applied at an input terminal 20. The input terminal 20 is connected to a delay circuit including a string of delay elements 21, 22 and 23. Each delay element imposes a delay equal to one line of the second field of the video signal. The video signal at the terminal 20 is applied directly to a (1,7,7,1) linear finite impulse response filter 24. The outputs from the delay elements 21, 22 and 23 are also applied in parallel to the filter 24.

The four parallel inputs to the filter 24 are low pass filtered to produce an output labelled yf. The output yf is supplied as one input to a summing element 25.

The inputs to the filter 24 are also applied in pairs to three 1,1 filters 26, 27 and 28 as shown to produce three signals a, b and c. The three signals a, b and c are applied as inputs to a non-linear adaptive filter 29. The output from the filter 29 labelled yn is supplied as a second input to the summing element 25.

In operation, the delay circuits 21, 22 ad 23 provide samples of the second field of the video signal which are vertically separated by one line and applied to the filter 24 in parallel with the input video signal. Simultaneously the filters 26, 27 and 28 receive pairs of the four vertically separately signals so as to produce the three signals a, b and c.

When the input b to the filter 29 has a magnitude outside the range spanned by the inputs a and c, this is indicative of high frequency information in the input video signal. The filter 29 adapts to provide a frequency response function in which it returns an output yn which is equal to zero. As a result the second field is filtered by the filter 24 only, which thus operates as a default interpolation filter. For high frequency vertical detail this default filter 24 provides sufficient attenuation to remove alias frequency components.

When the input b to the filter 29 is within a range between (3*a+c)/4 and (3*c+a), this is indicative of low frequency vertical information. The filter 29 adapts to provide a frequency response function in which it returns an output yn equal to 2*b-a-c. The combined effect of the filters 26, 27, 28 and 29 is to produce a (−1,1,1−1) filter. The overall filtering of the input video signal at the input terminal 20 through the filter 24 and the filters 26, 27, 28 and 29 is to produce a (−4,12,12,−4) filter when account is taken of a multiplication of yn by 5/16 and a multiplication of yf by 1/16 in the summing element 25. The filtered output video signal from the summing element 25 is subjected to a down-sampling conversion in a converter 30 to take alternative lines of the field.

The adaptive filter 29 may be implemented as a programmed device, the functions of which can be represented by programming instructions in 'C' as shown in FIG. 5.

In a conventional receiver, an up-sampling filter is employed for field 1 which is a (1) filter for odd lines and a (1,1) filter for even lines. In the case where a down-sampling conversion is cascaded with a sequence of previous down-sampling and up-sampling conversions, the input b1 to the filter 15 will already be the average of inputs a and c1. Similarly the input b2 to the filter 16 will already be the average of the inputs a and c2. This means that the filtering achieved by the filter of FIG. 1, in a second down-sampling conversion acts transparently thereby to preserve vertical chrominance detail. The subsequent receiver filter will also act transparently to preserve the vertical chrominance detail. This vertical chrominance detail can thus be preserved for multiple generations of conversions.

In the conventional receiver, an up-sampling filter for field 2 is a (1,3) filter and a (3,1) filter for alternate lines of chrominance. When the (−4,12,12,−4) filter of FIG. 2 is cascaded with a previous sequence of down-sampling and up-sampling conversions, a flat frequency response is produced for low frequencies, thereby ensuring that multiple conversion does not lead to an appreciable degradation in the chrominance information. The frequency responses of the filter of FIG. 2 are shown in the diagram of FIG. 3.

The invention provides a method and apparatus for filtering video signals which is an improvement over the known linear down-sampling filters in regard to colour balance from saturated areas. The improvement is effected without introducing artefacts into the transmission of the digital video signals and without significant increase in component complexity.

What is claimed is:

1. A method of filtering an interlaced digital video signal containing chrominance information, the method comprising:

applying the input video signal to a delay circuit to derive samples of the input signal representing spatially separated elements from each chrominance field of the signal;

comparing the magnitudes of the samples relative to one another to identify frequencies which fall within a plurality of predetermined ranges;

applying the input signal to an adaptive filter having a plurality of frequency response functions corresponding respectively to the predetermined frequency ranges; and, selecting a frequency response function in dependence upon the frequency range identified from the input signal samples.

2. A method as claimed in claim 1, in which the input signal is applied to an adaptive filter having frequency response functions such as to present a flat response to low frequencies and a low pass response to high frequencies.

3. A method as claimed in claim 1, wherein the input signal is applied to an adaptive filter which has no discontinuities between the response functions.

4. A method as claimed in claim 1, in which a first field of the digital video signal is applied to first delay elements of the delay circuit and first filter elements of the filter circuit and a second field of the digital video signal is applied to second delay elements of the delay circuit and second filter elements of the filter circuit.

5. A method as claimed in claim 4, wherein the first field of the digital video signal is applied to a string of four first delay elements and to two adaptive filter elements, the method further comprising the step of summing the outputs of the two adaptive filter elements.

6. A method as claimed in claim 4, wherein the second field of the digital signal is applied to a string of three delay elements, and to two filter elements of which one is a linear finite response filter element and the other an adaptive filter element, the method further comprising the step of summing the outputs of the linear finite response filter element and the adaptive filter element.

7. A method as claimed in claim 1, including the further step of down-sampling the video signal.

8. Filter apparatus for filtering an input interlaced digital video signal containing fields of chrominance information, the apparatus comprising:
    a delay circuit to receive the input video signal and to derive samples representing spatially separated elements from each chrominance field of the input signal;
    a comparator to compare the magnitudes of the samples relative to one another to identify frequencies within a plurality of predetermined frequency ranges;
    an adaptive filter having a plurality of frequency response functions corresponding respectively to the predetermined frequency ranges; and,
    a selector to select a frequency response function in dependence upon the frequency range identified by the comparator.

9. Apparatus as claimed in claim 8, wherein the adaptive filter has a frequency response function such as to present a flat response to low frequencies and a low pass response to high frequencies.

10. Apparatus as claimed in claim 8, wherein the adaptive filter has no discontinuities between the response functions.

11. Apparatus as claimed in claim 8, wherein the delay circuit includes first delay elements to receive a first field of the video signal and second delay elements to receive a second field of the video signal and the filter circuit includes first filter elements for the first field of the video signal and second filter elements for the second field of the video signal.

12. Apparatus as claimed in claim 11, wherein the first delay elements comprise a string of four delay elements and the first filter elements comprise two adaptive filter elements, the apparatus further comprising a summing element to sum the outputs of the two adaptive filter elements.

13. Apparatus as claimed in claim 11, wherein the second delay elements comprise a string of three delay elements and the second filter elements comprise a linear filter element and an adaptive filter element, the apparatus further comprising a summing element to sum the outputs of the second filter elements.

14. Apparatus as claimed in claim 8, further comprising a down-sampling converter to down-sample the video signal.

15. A method of filtering an interlaced digital video signal containing chrominance information, the method comprising:
    applying the input video signal to a delay circuit to derive samples of the input signal representing spatially separated elements from each chrominance field of the signal;
    comparing the magnitudes of the samples relative to one another to identify frequencies which fall within a plurality of predetermined ranges;
    applying the input signal to an adaptive filter having a plurality of frequency response functions corresponding respectively to the predetermined frequency ranges, whereby the adaptive filter has frequency response functions such as to present a flat response to low frequencies and a low pass response to high frequencies; and
    selecting a frequency response function in dependence upon the frequency range identified from the input signal samples.

16. Filter apparatus for filtering an input interlaced digital video signal containing fields of chrominance information, the apparatus comprising:
    a delay circuit to receive the input video signal and to derive samples representing spatially separated elements from each chrominance field of the input signal;
    a comparator to compare the magnitudes of the samples relative to one another to identify frequencies within a plurality of predetermined frequency ranges;
    an adaptive filter having a plurality of frequency response functions corresponding respectively to the predetermined frequency ranges, whereby the adaptive filter has frequency response functions such as to present a flat response to low frequencies and a low pass response to high frequencies; and
    a selector to select a frequency response function in dependence upon the frequency range identified by the comparator.

* * * * *